July 25, 1967  E. R. MARGIS  3,333,046
COUPLING ASSEMBLY
Filed April 30, 1965  2 Sheets-Sheet 1
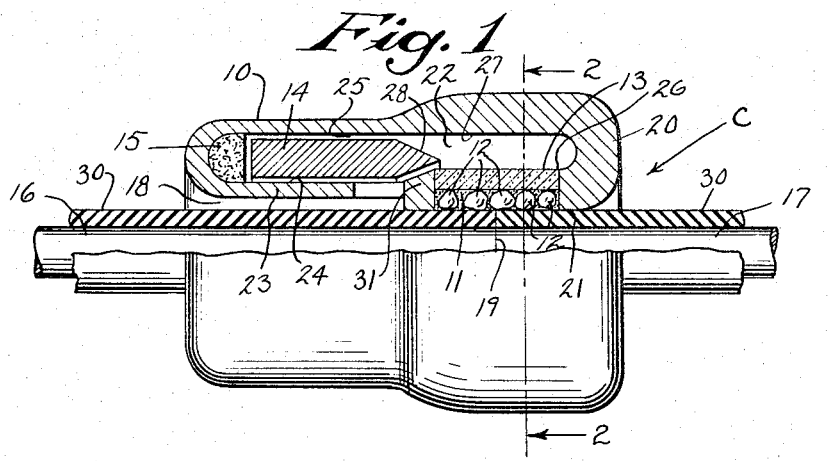
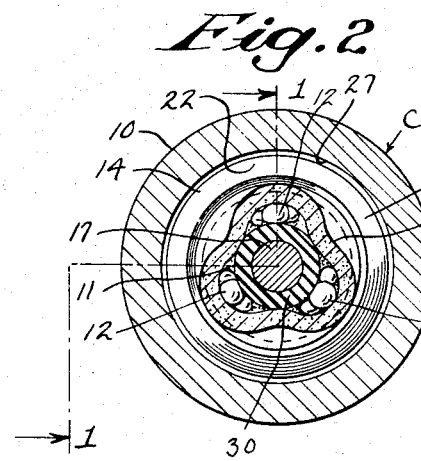
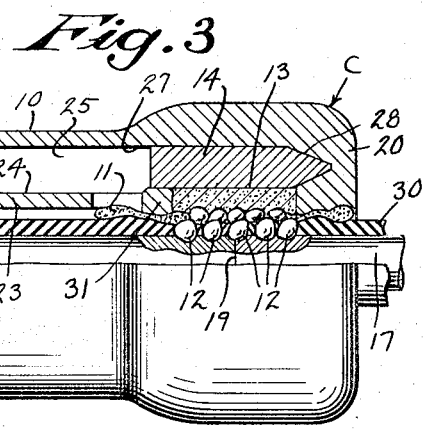
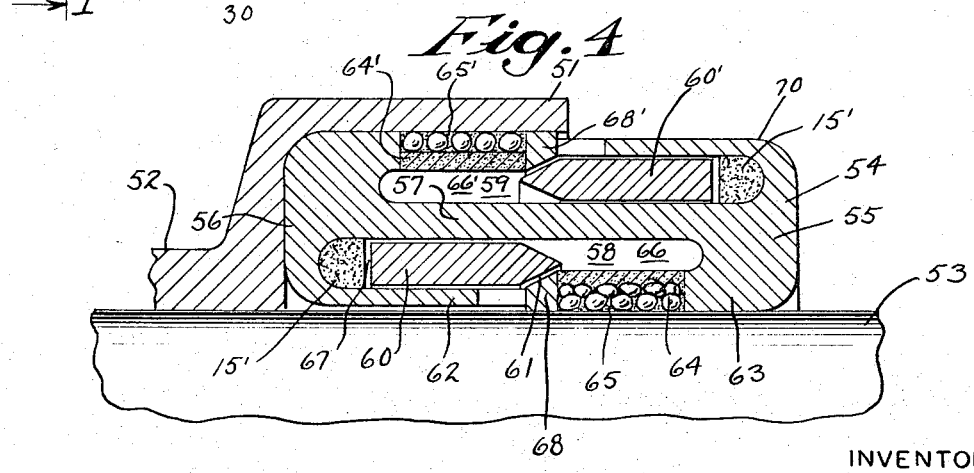
INVENTOR
EDWARD R. MARGIS
BY George H. Wright, Jr.

July 25, 1967    E. R. MARGIS    3,333,046
COUPLING ASSEMBLY
Filed April 30, 1965    2 Sheets-Sheet 2
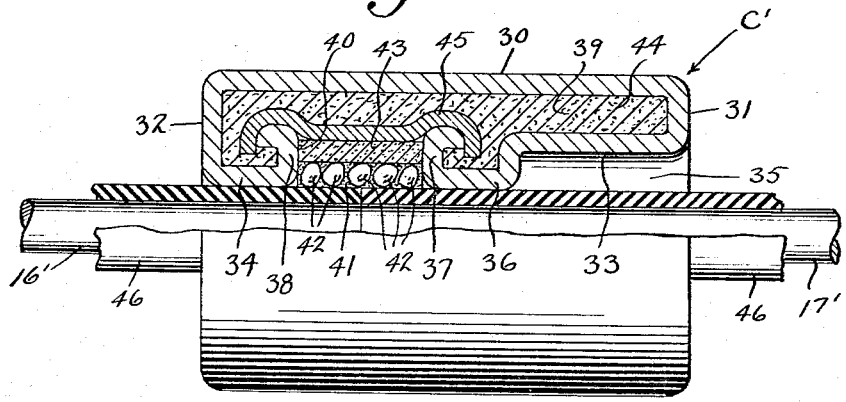
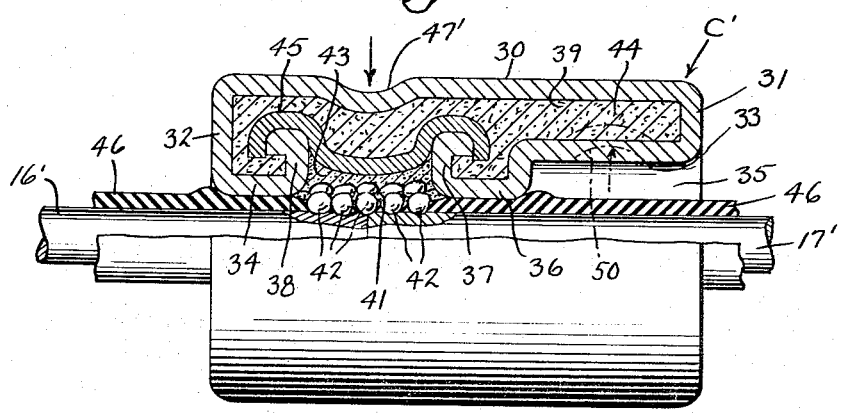
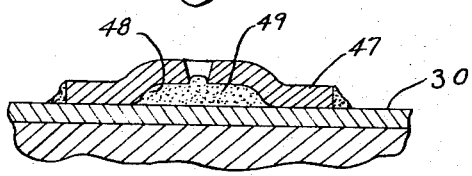
INVENTOR
EDWARD R. MARGIS
BY
George W. Wright, Jr

United States Patent Office 3,333,046
Patented July 25, 1967

3,333,046
COUPLING ASSEMBLY
Edward R. Margis, 5011 N. Palisades Road,
Whitefish Bay, Wis. 53217
Filed Apr. 30, 1965, Ser. No. 452,156
7 Claims. (Cl. 174—84)

ABSTRACT OF THE DISCLOSURE

A coupling for joining the abutting ends of conduits and the like together without the necessity of threading the conduit ends or utilizing other types of mechanical clamps or holds. The coupling having an outer casing of substantially cylindrical shape providing an axial opening therethrough for the reception of the conduit and providing a substantially hollow inner area a portion of which is in open communication with the axial opening. A cold flow type of material in the area in open communication with the axial opening and having embedded therein material of a hard granular nature. The body of the cylindrical casing being capable of deformation to apply pressure on the cold flow material so as to crowd the hard granular material and force the same into abutting ends of the conduits to be joined.

---

This invention appertains to joints and couplings and more particularly to new and useful improvements over the type of pressurized sealing and coupling structures shown and described in my co-pending application S.N. 414,690, filed Nov. 30, 1964 and entitled "Coupling and Sealing Structures."

In my co-pending application, I have shown and described a pressurized sealing and coupling structure which is particularly useful for joining together and sealing certain types of pipes and the like, and also particularly designed to alleviate the necessity of threading the ends of the pipes to form the usual joint. The particular structure shown and described in this co-pending application was a pressurized nature and included broadly, an inner cylindrical sleeve in which was embedded grains and granular material of a substance generally harder than the pipes to be joined. About this grain carrying material, which incidentally, was of the cold flow type, was a grain barrier and within the entire casing of the coupling I induced a pressure material, and when the material was induced under pressure it caused the inner sleeve to flow and the crowding of the grains forced the grains into the ends of the pipe to form a firm seal and coupling.

This type of coupling is useful in joining electrical conduits and making splices in wire and the like. While this coupling could readily be used for this purpose, it is a primary object of my present invention to provide a new and improved coupling utilizing the same principle but being particularly adaptable to joining electrical conduits and wires.

It is therefore, a salient feature of my present invention to provide a novel coupling structure particularly for electric conduits and the like, wherein the necessity of providing a pressurized fitting and applying pressurized material into the casing is alleviated.

Another object of my present invention is to provide a coupling wherein in most instances the insulation of the wire or conduit does not need to be removed or stripped. This is particularly true where the insulation material is of soft vinyl type, and means is therefore provided to cause the cold flow grain carrying material to spread and to crowd and press the grains through the insulation material and into the electric conducting material, the grains in this instance being of a conductive type.

Still another object of my present invention is to provide a coupling embodying a cylindrical grain carrying sleeve of a cold flow material, and whereby mechanical means is utilized to reduce the area adjacent the sleeve to cause the cold flow material to flow and to embed the grains into the members to be joined.

A more specific object of my present invention is to provide a relatively compact coupling having an opening through its axial center into which the wires or electrical conduits to be joined may be placed, one portion of the casing carrying the cold flow sleeve and another portion of the casing carrying a cylindrical sliding ram, the ram being adapted to be moved from its initial inoperative position to a position adjacent the cold flow sleeve to reduce the area adjacent the sleeve and to embed the grains into the electrical conduit.

A further object of my present invention is to provide a novel coupling wherein the casing is provided with a sealed space carrying a material under slight pressure and wherein the area receiving such material may be reduced thus putting pressure on the cold flow grain carrying material to cause the material to flow and the grains to be embedded in the material to be joined.

Another important object of my present invention is to provide a coupling particularly adapted to join electrical conducts and/or wires and the like wherein the cold flow material carrying the conductive grains is in itself a known conductive insulation material, so that when pressure is placed upon the cold flow material, it will spread and insulate the outer portions of the conduit or wire while the conductive grains are embedded in the conductive portions of the electrical conduit or wire.

With these and other objects in view, the invention consists in the novel construction, arrangement and formation of parts, as will be hereinafter more specifically described, claimed and illustrated in the accompanying drawings, in which drawings, FIGURE 1 is a fragmentary longitudinal section, taken through one form of my novel coupling shown in its initial inoperative position, the section being represented by the line 1—1 of FIGURE 2 of the drawings, and looking in the direction of the arrows;

FIGURE 2 is a vertical transverse section taken through the coupling as shown in FIGURE 1 of the drawings, the section being taken on the line 2—2 of FIGURE 1 and looking in the direction of the arrows;

FIGURE 3 is a longitudinal fragmentary section similar to FIGURE 1 of the drawings but showing the coupling in its operative position, certain parts of the conductive material being broken away to illustrate how the grains are embedded therein;

FIGURE 4 is a fragmentary section through a modified form of the coupling shown in FIGURES 1 to 3 of the drawings, wherein the coupling is particularly useful for joining pipes of the type having a bell joint;

FIGURE 5 is a longitudinal fragmentary section similar to FIGURE 1 of the drawings, but showing a further modification of the coupling particularly adapted for electrical conduits, the coupling being shown in its inoperative position;

FIGURE 6 is a longitudinal fragmentary section similar to FIGURE 5 of the drawings, but showing the coupling in its operative position with the conduits spliced and joined, and FIGURE 7 is an enlarged fragmentary view showing one means employed for reducing the interior area of that form of the invention shown in FIGURES 5 and 6 of the drawings.

Referring now to the drawings in detail, wherein similar reference characters designate corresponding parts throughout the several views, the letter C generally indicates one type of my improved coupling, and referring more particularly to FIGURES 1 to 3 of the drawings, it can be seen that the coupling C includes broadly an outer casing 10, an inner cylindrical sleeve 11 of a cold flow material carrying the grains 12, a grain barrier 13, a sliding wedge ram 14, and means 15 in the nature of a powder charge for actuating the movement of the ram.

As previously brought out, the present invention is particularly designed to join or splice electrical conduits and/or wire, but it is to be understood that the various forms illustrated in this application can also be utilized to join different types of pipe. However, this coupling is particularly useful in joining electrical conduit and wire, without the necessity generally of stripping the insulation forming the splice and thereafter re-insulating the box. In most cases, all that is necessary is to abut the ends of the electrical conduit or wire, indicated by the reference numerals 16, 17 so that they are received within the axial opening 18 of the coupling and so that their abutting ends 19 are positioned adjacent the cold flow grain carrying sleeve 11.

Thus, the outer casing 10 is so shaped as to provide a vertical wall 20, which is curved inwardly to present an annular vertical face 21. Within the casing is an open area or space 22. The other end of the casing is provided with an inturned annular wall 23 and this wall 23 terminates a substantial distance from the wall 21 and the inner edge 24 thereof defines a space 25 of a greater area than the space defined by the inner wall 26. Therefore, this is spaced a greater distance from the inner surface 27 of the casing. Carried within the space defined by the wall 23 is the cylindrical ram 14 and one end thereof is provided with a wedged face 28. The other end of the ram space is provided for the charge 15. Closing the main annular opening is the sleeve 11 of the aforementioned cold flow material carrying the conductive grains 12 and about this sleeve is another cylindrical sleeve of a material which is of a hardness similar to the grains and this material acts as a grain barrier to prevent the grains from merely floating. The grains should be of a material of greater hardness than the material to be joined. Therefore, the grain barrier confines the area of movement of the grains and as can be seen, if the grain barrier is reduced in area it will cause the cold flow material to flow and crowd the grains. Thus the grains are forced into the elements to be joined. Attention is now directed to FIGURE 2 of the drawings, wherein it can be seen that the grain barrier is not actually cylindrical in shape but has a wavy configuration so that when the ram wedge moves forward from the position shown in FIGURE 1 to the position shown in FIGURE 3, it will have room to move and squeeze the cold flow material carrying the grains. In operation, therefore, it can be seen that when the charge 15 is set off, and this can be done with electricity or heat, the cylindrical ram will move from its position in FIGURE 1, into the restricted space and squeeze the grain barrier about the cold flow material and cause this material to flow, as shown in FIGURE 3. This, in turn, results in the crowding of the grains and forcing of the grains against the barrier through the insulation material 30 and into the electrical conducting material, as shown in FIGURE 3. It should also be noted that the squeezing of the cold flow material about the break in the insulation material will form a further insulation. However, if desired to insure that the coupling itself will be thoroughly insulated, it may be sprayed with an insulation material after joining.

In order to guide the movement of the ram 14 and to also confine the grain barrier and cold flow material in its proper position, I provide an annular ring 31 adjacent the vertical surface 26 and the inner wall of this ring is provided with an angle similar to the angle of the wedge, and thus when the ram is moved under force to its operative position, it is guided into the space above the grain barrier and actually moves the ring inwardly slightly to further compress the cold flow material.

Attention is now directed to FIGURES 5 and 6 of the drawings, wherein I have illustrated a modified form of the present invention. In this modification the coupling C' is of a general cylindrical shape and therefore includes the outer longitudinally extending wall 30 and end walls 31 and 32, respectively. Spaced from and extending longitudinally therewith are the inner walls 33 and 34 respectively and these circular walls are substantially parallel to the outer wall 30 and define a longitudinally extending axial opening 35 through the coupling. It should be here stressed that the coupling can be made in various sizes to accommodate different diameters of wire and conduit and of course, can also be readily adapted to join different sized tubes and pipes. Thus, the axial opening 35 particularly defined by the circular walls 34 and portion 36 of wall 33, is of a size and configuration to snugly receive the members to be joined. In this instance, circular wires 16' and 17' are the members. Walls 34 and 33 terminate in spaced relation, one from the other, and this space is defined by the vertically extending inner walls 37 and 38. Thus, it can be seen that within the coupling C is provided an opening or area 39 which is in communication with the circular opening 40. The opening 40 therefore is generally closed by a sleeve 41 of the aforementioned cold flow material and carrying the grains 42, and particularly when used for splicing or joining electric wire or conduit, the grains are of a conductive material. About the sleeve of cold flow material is the grain barrier 43 and again, this barrier has a wavy configuration similar to that shown in FIGURE 2 of the drawings, and must be of a material which is as hard as the material to be joined so that when pressure is applied to the cold flow material the grains will be embedded in the material to be joined and will not penetrate past the grain barrier. Space 39 is completely filled with a putty-like material 44, preferably, but not necessarily, under slight pressure. In order to keep this putty-like material from leaking past the grain barrier and cold flow sleeve, I provide a deformable sealing member 45 and it should be noted that the terminations of the vertical walls 38 and 37 form seats to receive the deformable seal 45. This deformable seal can be of a soft metal of a well known resilient seal material. Thus, it can be seen that in utilizing the form of coupling C' shown in FIGURES 5 and 6 it is merely necessary to abut the ends of the wires 16' and 17' so that they meet at a point adjacent the approximate center of the cold flow sleeve 41. In most instances, it is not necessary to strip the insulation material 46 from the conductive portion of the wire; however, should the insulation material be of a type wherein the grains 42 would not completely penetrate, it is then advisable to strip the end terminations of the wire or conduit. In any event, it is now readily apparent that if the space 39 is reduced in area, force or pressure will be exerted within the coupling, and inasmuch as the grain barrier 43 and cold flow sleeve 41 form the weakest portion of the coupling, this force will distort the grain barrier and cause the cold flow material to be squeezed and the grains crowded. Thus, the grains will move by force into and be embedded within the conductive material of the wires 16' and 17'. It is also again noted that preferably, the cold flow material is of an insulating type. In some instances, however, it may be found that the grains are not only embedded themselves in the material to be joined and certain parts of the grain barrier but may contact the metallic walls 38 and 37. If this is the case, the entire coupling may easily be sprayed with an insulation material so that the conduit or wire can be safely handled and used.

In order to reduce the area 39, the outer wall 30 is preferably deformed by being struck forcibly with any desired instrument. The representation of the deformation of the wall 30 is shown in FIGURE 6 and indicated by the reference numeral 47'. Wall 33 adjacent the end 31 is preferably enlarged so that the interior diameter of the opening is larger than the diameter of the wire or conduit to be joined. The reason for this will be apparent as the description proceeds. In FIGURE 7 I have illustrated another means whereby the deformation of the wall 30 may be produced and with the result that pressure is applied on the grain barrier and cold flow sleeve 41. To accomplish this, I may weld a small disc 47 firmly to the wall 30 and this disc is formed to provide a small interior space 48. This space is in turn, filled with an explosive material 49. Material 49 can be set off either by heat or by electric charge, and when set off will deform the wall 30 in a manner similar to that described in connection with FIGURE 6. Since it is known when the area 39 is reduced, the force is applied in all directions, it has been found that very little deformation of the wall 30 is needed to move the grains through the insulation and to embed the same into the conductive material. It may also be advantageous to weld the disc 47 to the enlarged portion of the inner wall 33. In fact, a number of these discs may be applied to inner wall 33 and set off as aforementioned, and this will cause a deformation as indicated in dotted lines at 50 and produce the same result.

Attention should be directed to the fact that for the purposes of illustration the grains have been shown enlarged and appear to be spaced one from the other. Actually, of course, the grains will be crowded and pressed against one another and will thus embed themselves firmly into the material to be joined.

From the foregoing, it can be seen that I have provided a novel coupling for adaptation particularly to join electric wires and conduits, and which can be easily put in place and provide a joint which is positive and easily made generally without the necessity of stripping the insulation material and without treating the ends of the wires or conduit in any manner. This form of the invention, however, can be readily adapted to join together pipe or tubing as described in my co-pending application. One adaptation to this use is illustrated in FIGURE 4 of the drawings, and this form illustrates a still further modification, particularly adapted to join pipe of the so-called bell configuration, wherein one end termination 51 of pipe 52 is of essentially a greater diameter than the diameter of the pipe 53 to be joined thereto. In this form of the invention, it is necessary therefore, to affix coupling 54 to both pipe 53 and the enlarged bell opening 51 of pipe 52 and preferably in this form of the invention, I utilize the sliding ram principle indicated by the reference number 14 in FIGURES 1 and 3 of the drawings. Therefore coupling 54 is again of a general cylindrical shape and joining the end walls 55 and 56 respectively, I provide the intermediate partition which divides the coupling into two spaces 58 and 59. For purposes of description, space 58 will be referred to as the inner space and 59 as the outer space. The structure of inner space 58 is quite similar to the space described in reference to FIGURES 1 and 3 of the drawings, and therefore one end thereof houses the ram 60, which is in the nature of a cylindrical sleeve and is provided with the bevel edge 61 in back of which is the charge 15'. Walls 62 and 63 extend substantially parallel to and longitudinally with the partition 57 and define the axial opening through the coupling 54. Again, these are of a size and configuration to snugly receive the particular pipe or tubing to be joined. Again, grain barrier 64 and the cold flow grain carrying sleeve 65 are provided and positioned to contact the inner pipe member 53 and space 66 is, of course, of a smaller area and dimension than space 67. Retaining and guide ring 68 is also positioned adjacent one end of the grain barrier and grain carrying sleeve. Thus, when the charge 15' is detonated, ram 60 will move into space 66 and embed and force the grains into pipe 53. The outer wall 70 of coupling 54 also is provided with an opening, which in turn, is closed by grain barrier 64' and the cold flow grain carrying sleeve 65'. A ring 68' is provided and again, a ram 60' is positioned so that the charge when detonated will move ram 60' into the restricted space 66' and cause the grains of the grain carrying sleeve 65' to embed themselves within the bell opening 51, thus joining the two sections of pipe 52 and 53.

In actual practice, both charges 15 may be detonated at once, or together, but if necessary the coupling 54 could first be placed about pipe 53, charge 15' detonated, so that the coupling will now be affixed to pipe 53, then the bell end 51 of the pipe 52 can be moved over the coupling and then ram 60' moved to its position to firmly join the two pipes together.

It is important to stress that particularly in the form of the invention illustrated in FIGURES 1 to 4 of the drawings, the enlarged portion of the axial opening 18 (FIGS. 1 to 3) must be in alignment with the space 25 so that when the charge 15 is detonated gases may leak out and not distort or rupture the housing. While I have not shown or described the outer cylindrical casing 10 of the coupling C in two parts, the portion carrying the charge 15 could be separate and threadedly joined to the rim of the coupling. This is not a desired feature but it is thought important to stress this point.

From the foregoing, it is believed that the features and advantages of my invention will be readily apparent to those skilled in the art, and that I have amply described an improved means for particularly joining electrical wires and conduits, and therefore, of course, it will be understood that changes in the form, proportion and minor details of construction may be resorted to without departing from the spirit of the invention or scope of the appended claims.

I claim:

1. A coupling assembly including, a generally cylindrical shaped body having a longitudinally extending axial opening therethrough, said body having an outer longitudinally extending cylindrical wall, end walls and inwardly extending longitudinal inner walls terminating in spaced relation, all of said walls being integral and providing a unitary structure defining an annular space and chamber within said body, a sleeve formed of a cold flow material positioned between the end terminations of said longitudinally extending inner walls, the inner circumference of said sleeve being substantially the same as said axial opening and in alignment therewith and closing the space between said inner walls, relatively hard granular material dispersed within said sleeve, means for reducing the area within said chamber and applying force and pressure on said sleeve to cause said cold flow material to flow and to crowd said granular material and force the same into the inner area defined by said sleeve of cold flow material.

2. A coupling assembly as set forth in claim 1, wherein said means for applying force and pressure on said sleeve includes, a cylindrical ram positioned in said space and chamber away from said sleeve, an explosive material adjacent an end of said ram opposite said sleeve, said ram being of a size and configuration to be snugly received within said space and said sleeve being of a size and configuration to provide an area adjacent and above said sleeve of smaller dimension than the dimension of said ram, whereby when said ram is moved by force into said area above and adjacent said sleeve said sleeve will be squeezed and restricted and said material will flow to crowd said granular material and force the same into the inner area defined by said sleeve.

3. A coupling assembly including, a generally cylindrical shaped body having a longitudinally extending axial opening therethrough, said body having an outer longitudinally extending cylindrical wall, end walls and inwardly extending longitudinal inner walls terminating in spaced relation, all of said walls being integral and providing a unitary structure defining an annular space and chamber within said body, a sleeve formed of a cold flow material positioned between the end terminations of said longitudinally extending inner walls, the inner circumference of said sleeve being substantially the same as said axial opening, and in alignment therewith and closing the space between said inner walls, relatively hard granular material dispersed within said sleeve, an integral continuous grain barrier about said sleeve of a material at least as hard as said granular material and having a wavy configuration in cross-section, a length of conduit being inserted into each end of said opening with their abutting ends being positioned within the area defined by said sleeve, means reducing the area within said chamber and applying force and pressure on said sleeve to cause said cold flow material to flow and to crowd said granular material and force the same into the respective abutting ends of said conduits.

4. A coupling assembly as set forth in claim 3, wherein said means applying force and pressure on said sleeve includes a putty-like material completely filling said space and chamber and reducing the area within said chamber by deformation of a part of the walls of said body.

5. A coupling assembly as set forth in claim 4, wherein said deformed part of said wall is deformed by an explosive charge confined within a disc welded to said wall portion.

6. A coupling assembly as set forth in claim 3, wherein said granular material is of an electric conductive material and wherein said cold flow material is of an insulating material, and said conduits being electrical conduits.

7. A coupling assembly as set forth in claim 3, wherein said means applying force and pressure on said sleeve includes, a cylindrical ram positioned in said space and chamber away from said sleeve, an explosive material adjacent an end of said ram opposite said sleeve, said ram being of a size and configuration to be snugly received within said space and said sleeve being of a size and configuration to provide an area adjacent and above said sleeve of smaller dimension than the dimension of said ram, whereby when said ram is moved by force into said area above and adjacent said sleeve said sleeve will be squeezed and restricted and said material will flow to crowd said granular material and force the same into the respective abutting ends of said conduits.

No references cited.

DARRELL L. CLAY, *Primary Examiner.*